Sept. 19, 1961    L. N. HERMANN ET AL    3,001,114
TRANSISTOR CONTROLLED ELECTRONIC CLOCK
Filed April 16, 1959
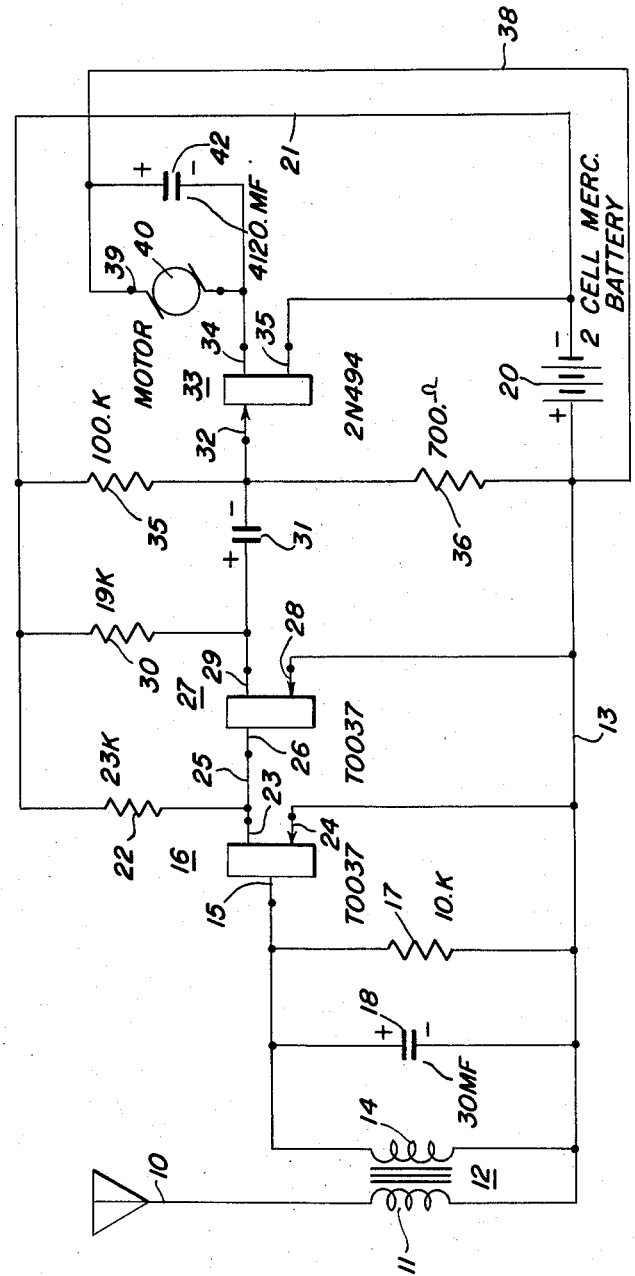
INVENTORS
LEE N. HERMANN
RICHARD P. LANDGRAF
BY Hurwitz & Rose
ATTORNEYS United States Patent Office 3,001,114
Patented Sept. 19, 1961

3,001,114
TRANSISTOR CONTROLLED ELECTRONIC CLOCK
Lee N. Hermann, 707 Mosedale St., St. Charles, Ill., and Richard P. Landgraf, 9948 S. Hayne, Chicago, Ill.
Filed Apr. 16, 1959, Ser. No. 806,934
3 Claims. (Cl. 318—16)

The present invention relates generally to the control of synchronous motors in response to stray 60 cycle electric fields, such as are normally available in dwellings, buildings, and the like, and more particularly to the synchronous control of clock motors powered by small low-capacity electric batteries, in response to stray fields.

It has long been recognized that stray electric fields exist in dwellings, laboratories, public buildings, or the like, and that such fields have sufficient strength to be utilizable in synchronizing electrical equipments. For example, it has long been a common expedient in electrical and electronic laboratories to obtain an accurate 60 cycle sweep synchronizing voltage for cathode ray tubes, by merely applying the finger of a person utilizing an oscilloscope to the appropriate input terminal of the oscilloscope. In such case the body is an antenna. In other cases the expedient has been utilized of connecting one end of a wire of perhaps three to six feet in length to the appropriate terminal of the oscilloscope, to provide synchronizing signal to sweep circuits thereof. In such cases, the amplitude of the synchronizing voltage required is small and experience has indicated that sufficient voltage exists in the average building or home to provide as much synchronizing voltage as is requisite for the purpose, when either the body or a length of wire is employed as a probe or pick-up. It is also known that the available stray field synchronizing voltages may be utilized to operate synchronous motors from batteries, by suitably amplifying the synchronizing voltages. The suitable expedient for effecting the amplification to sufficiently high values is the transistor, since transistors operate on very low current drains and on very low voltages, and are highly efficient, and therefore do not require more power over long periods of time then is conveniently available from two mercury cells of the conventional type.

If a clock synchronizing system consists of several stages of transistor amplification, and no more, so that the clock is essentially driven from 60 cycle signal supplied by the amplifiers, it is found that the system is not satisfactory, because clocks may be placed at random positions in a dwelling or building, and the position selected may be one at which fields are extremely weak or are variable, i.e., sometimes strong and sometimes weak, according to the status and load presented to the electric power circuitry of the building or dwelling. Where amplifiers operate on low amplitude signals, signals to noise ratio may be low and accordingly insufficient 60 c.p.s. signal may at times be present to drive the clock, so that the motors of such clocks fall out of synchronism and the clocks do not keep accurate time, and accordingly do not find favor with the buying public.

It is an object of the present invention to provide a synchronous motor control circuit which is capable of operating with great precision, even in the presence of noise, in response to relatively weak stray signals.

It is a further feature of the present invention to provide a synchronous motor control circuit wherein the synchronous motor is powered from D.-C. batteries by synchronized constant power D.-C. current pulses, the latter being produced in response to positive half cycles of a sixty cycle stray field with complete reliability and uniformity and even where the field is extremely weak or variable in amplitude.

Briefly describing a preferred embodiment of the present invention, stray signal in a dwelling is picked up by a probe, such as an antenna or capacitive pick-up, and passed to a two stage transistor voltage amplifier via an impedance matching device and a tuned circuit. The tuned circuit provides sufficient selectivity to remove a considerable portion of the electrical noise which may exist in the dwelling, and provides a resonant gain of voltage at the input of the transistor amplifier. The output of the transistor amplifier is utilized to drive a double base diode. The double base diode is a semi-conductive device having an emitter electrode and two base electrodes, between which exists a negative resistance when emitter voltage exceeds some small predetermined value. The base electrodes of the double diode are connected in a series circuit including a source of voltage and a synchronous electric motor. The emitter of the double base diode is capacitively coupled to the output of the transistor amplifier. The double base diode acts in a manner analogous to a thyratron, i.e., it is triggered on in response to some predetermined extremely small emitter voltage, and when triggered on a heavy current flows between the two base electrodes, this heavy current being essentially a saturation current. This implies that approximately the same current will flow wherever the two bases provide a conductive path, regardless of the emitter current or voltage at the moment. So long as the emitter voltage is sufficiently high to effect discharge between the base electrodes, the discharge is of a saturation current, and the discharge continues until the emitter voltage has become sufficiently negative to cut off the device. In this respect the device is analogous to a thyratron, which provides a small resistance path when fired, regardless of the amplitude of the triggering voltage, so only that the latter is sufficient to initiate the discharge.

Since the double base diode requires but an extremely small positive voltage to effect discharge, it may be made extremely sensitive to small stray A.-C. fields. The motor is accordingly supplied with pulses of current during substantially full positive half cycles of stray synchronizing signal. The pulses of current are substantially square waves, i.e., the double diode acts essentially as a switch which is closed whenever the synchronizing signal is positive, and is open when the synchronizing signal is negative.

Utilization of a double base diode to control armature current, for synchronizing a synchronous motor in response to stray fields, provides the advantage that a full power cycle is furnished to the motor regardless of amplitude of input signal, which insures that the motor will operate in synchronism with the stray field and cannot fall out of synchronism.

In order to assure that the double base diode will operate only for positive half cycles it is coupled to the preceding voltage amplifier through a coupling condenser, so that only A.-C. signal voltage reaches the double base diode from the transistor amplifier. Moreover, the motor itself is provided with a large capacitor which tends to smooth transients at the motor, avoiding shock excitation thereof.

It is accordingly a feature of the present invention to drive a synchronous motor from stray electric fields by connecting said motor in series with the bases of a double base diode and supplying the stray fields to the emitter of a double base diode, whereby pulses of current of substantially constant amplitudes and durations are applied to the motor regardless of variations of amplitude of the stray fields.

The above and still further objects advantages and features of the present invention will become apparent upon consideration of the following detailed description of one specific embodiment thereof, especially when taken in conjunction with the accompanying drawings, wherein:

The single figure of the accompanying drawings is a schematic circuit diagram of a system in accordance with the invention.

Referring now more specifically to the accompanying drawings, the reference numeral 10 denotes a pick up probe, in the form of an antenna or a capacitive pick up. The probe 10 is connected in series with the primary winding 11 of a transformer 12, one terminal of which is connected to a point of reference potential represented by a line 13. The secondary winding 14 of the transformer 12 is connected between the line 13 and the base electrode 15 of a transistor amplifier 16, connected to operate as a voltage amplifier. A 10 kilohm resistance is connected between the base 15 and the line 13, and establishes a bias for the transistor. Connected across the resistance 17 in shunt thereto, is connected a condenser 18, which also shunts the secondary winding 14 and serves to tune the latter to 60 cycles. The transformer 12 is utilized for the purpose of impedance transformation, i.e., the primary winding has an impedance of approximately 50,000 ohms and the secondary an impedance of approximately 7.5 ohms, so that the circuit comprising the secondary winding 14 and the capacitor 18 may have a relatively high Q and be well peaked to the input signal. Collector voltage is applied to the transistor 16 from a two cell mercury battery 20, the negative terminal of which is connected via a lead 21 and a 23K resistance 22 to the collector 23 of the transistor 16.

The emitter of the transistor 16 is connected directly to the line 13 so that the transistor is operating in the grounded emitter configuration, and provides high amplification or gain. The positive terminal of the battery 20 is connected directly to the line 13.

The collector 23 of the transistor 16 is connected directly via a lead 25 to the base 26 of the transistor 27. The emitter 28 of the latter is connected directly to the lead 13 and the collector is connected via a 19K resistance 30 to the lead 21. Accordingly, the second stage of amplification comprising the transistor 27 operates in the grounded emitter configuration and provides high voltage amplification. The collector 29 is connected through a series capacitor 31 to the emitter 32 of a double base diode 33 having bases 34 and 35. The emitter 32 is biased at a fixed value by means of a voltage divider comprising resistances 35 and 36 connected in series between the line 21 and the line 13. The resistance 35 may have a value of 200K while the resistance 36 has a value of 700 ohms, so that the emitter 32 is biased to very nearly the potential of the line 13, i.e., reference potential, but is very slightly thereabove. This bias remains fixed under operating conditions, and accordingly the capacitor 31 provides A.C. voltage to the emitter 32 at the pick up voltage, i.e., 60 c.p.s., the amplitude of the voltage oscillating about the bias value established by the voltage divider comprising resistances 35 and 36.

The positive terminal of the battery 20 is connected via lead 38 to one terminal 39 of a synchronous motor 40, the remaining terminal 41 of which is connected to the base 34 of the double base diode. The remaining base 35 is connected to the negative terminal of battery 20. Connected across the motor 40 is a relatively large condenser 42. Accordingly, the motor 40 is connected in series with the bases 34, 35 of the double diode 33, and since the latter operates as a negative resistance on application to the emitter 32 of a voltage greater than triggering voltage, a highly conductive path is provided between the base electrodes 35, 34 whenever the A.C. voltage applied to the emitter 32 becomes positive. The value of the current flow is not affected by the value of the emitter voltage, i.e., the double base diode acts essentially as a switch tube or thyratron, which is closed in response to a positive voltage of substantially any magnitude above a small bias voltage, and which remains fully closed until the emitter voltage has become negative.

It follows that the square wave pulses of current are applied to the motor, which have the same power or the same peak amplitudes and durations, regardless of the amplitude of the stray signal intercepted by the probe 10.

The condenser 42 serves to smooth out the current as seen by the motor 40, since it presents a small impedance to sharply varying wave fronts and an open circuit to the tops of the applied pulses.

While we have described and illustrated one specific embodiment of our invention, it will be clear that variations of the general arrangement and of the details of construction which are specifically illustrated and described may be resorted to without departing from the true spirit and scope of the invention as defined in the appended claims.

What we claim is:

1. A system for maintaining synchronism of a synchronous motor with a stray sixty cycle per second electric field, comprising a probe responsive to said field to generate a sixty cycle voltage, an impedance step-down transformer having a primary winding and a secondary winding, a condenser for resonating with said secondary winding at sixty cycles per second, said condenser being connected across said secondary winding, said primary winding being connected in series with said probe, a transistor voltage amplifier coupled in cascade with said secondary winding, said transistor voltage amplifier having an output terminal, a double base diode having an emitter and a pair of bases, means consisting of a coupling capacitor for connection between said output terminal and said emitter, means biasing said emitter at a fixed voltage adjacent a reference value and slightly positive with respect thereto, said last means including a battery having a positive and a negative terminal, means connecting said positive terminal via a relatively small resistance to said emitter, said positive terminal being at said reference value of voltage, a relatively high resistance connected between said negative terminal and said emitter, and leads connecting said synchronous clock motor in series with said battery and with said pair of base electrodes.

2. A system for maintaining synchronism of a synchronous motor with a stray sixty cycle per second electric field, comprising a probe responsive to said field to generate a sixty cycle voltage, an impedance step-down transformer having a primary winding and a secondary winding, a condenser for resonating with said secondary winding at sixty cycles per second, said condenser being connected across said secondary winding, said primary winding being connected in series with said probe, a transistor voltage amplifier coupled in cascade with said secondary winding, said transistor voltage amplifier having an output terminal, a double base diode having an emitter and a pair of bases, means for coupling said output terminal and said emitter, means biasing said emitter at a fixed voltage adjacent a reference value, said last means including a battery having a first terminal and a second terminal, means connecting said first terminal to said emitter, said first terminal being substantially at said reference value, a relatively high resistance connected between said second terminal and said emitter, and leads connecting said synchronous motor in series with said battery and with said pair of base electrodes.

3. A system for maintaining synchronism of a synchronous motor with a stray sixty cycle per second electric field, comprising a probe responsive to said field to generate a sixty cycle voltage, a double base diode having an emitter and a pair of bases, means coupling said probe to said emitter, means consisting of a coupling capacitor for connection between said output terminal and said emitter, means biasing said emitter at a fixed voltage adjacent a reference value and slightly positive with respect thereto, said last means including a battery having a positive and a negative terminal, means connecting said positive terminal via a relatively small resistance to said emitter, said positive terminal being at said reference value of voltage, a relatively high resistance connected between said negative terminal and said emitter, and leads connecting said synchronous clock motor in series with said battery and with said pair of base electrodes.

References Cited in the file of this patent

UNITED STATES PATENTS

| | | |
|---|---|---|
| 2,786,972 | Dreier et al. | Mar. 26, 1957 |
| 2,814,789 | Williams | Nov. 26, 1957 |

OTHER REFERENCES

Bistable Circuits using Unijunction Transistors, pp. 89–91, Dec. 19, 1958, issue of Electronics Magazine.